United States Patent
Davis

(10) Patent No.: US 8,542,689 B2
(45) Date of Patent: *Sep. 24, 2013

(54) LAN EMULATION OVER INFINIBAND FABRIC APPARATUS, SYSTEMS, AND METHODS

(75) Inventor: Arlin R. Davis, Yamhill, OR (US)

(73) Assignee: Intel Corporation, Santa Clara, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 13/184,230

(22) Filed: Jul. 15, 2011

(65) Prior Publication Data

US 2011/0268117 A1    Nov. 3, 2011

Related U.S. Application Data

(63) Continuation of application No. 12/784,378, filed on May 20, 2010, now Pat. No. 7,983,275, which is a continuation of application No. 11/431,039, filed on May 9, 2006, now Pat. No. 7,724,748, which is a continuation of application No. 09/749,383, filed on Dec. 28, 2000, now abandoned.

(51) Int. Cl.
*H04L 12/28* (2006.01)

(52) U.S. Cl.
USPC .................. 370/395.53; 370/419; 709/221

(58) Field of Classification Search
USPC ............... 370/352, 389, 390, 395.1, 395.3, 370/395.53–395.54, 419–420; 709/221, 709/238–239
See application file for complete search history.

(56) References Cited

U.S. PATENT DOCUMENTS

| | | | |
|---|---|---|---|
| 6,023,581 A * | 2/2000 | Matsuura | 714/4.1 |
| 6,172,981 B1 | 1/2001 | Cox et al. | |
| 6,256,314 B1 | 7/2001 | Rodrig et al. | |
| 6,377,990 B1 | 4/2002 | Slemmer et al. | |
| 6,389,021 B1 | 5/2002 | Horikawa | |
| 6,411,625 B1 | 6/2002 | Furuhashi et al. | |
| 6,574,664 B1 | 6/2003 | Liu et al. | |
| 6,690,757 B1 * | 2/2004 | Bunton et al. | 375/371 |
| 6,694,361 B1 | 2/2004 | Shah et al. | |
| 6,711,162 B1 | 3/2004 | Ortega et al. | |
| 6,728,249 B2 | 4/2004 | Chang | |

(Continued)

OTHER PUBLICATIONS

"U.S. Appl. No. 11/431,039 Non-Final Office Action mailed Apr. 13, 2009", 5 pgs.

(Continued)

*Primary Examiner* — Kevin Mew
(74) *Attorney, Agent, or Firm* — Schwegman, Lundberg & Woessner, P.A.

(57) ABSTRACT

A method and device for local area network (LAN) emulation over an Infiniband (IB) fabric. An IB LAN driver at a first node on an IB fabric receives the port and associated local identifier (LID) of one or more remote peer nodes on the IB fabric. An IEEE 802.3 Ethernet MAC address with one LID imbedded is generated. The imbedded LID is for one or more remote peer nodes. The IB LAN driver sends the Ethernet MAC address to an Address Resolution Protocol (ARP). A logical address of a remote peer node is generated by a network protocol. The logical address is mapped to an Ethernet MAC address. The IB LAN driver sends the Ethernet MAC address onto the IB fabric to the one or more remote peer nodes. The remote peer nodes appear to reside on an Ethernet network to the network protocol.

20 Claims, 5 Drawing Sheets

(56) References Cited

U.S. PATENT DOCUMENTS

| | | | |
|---|---|---|---|
| 6,789,104 B1 | 9/2004 | Yamaguchi et al. | |
| 6,870,837 B2 | 3/2005 | Ho et al. | |
| 6,988,150 B2* | 1/2006 | Matters et al. | 710/36 |
| 7,149,817 B2* | 12/2006 | Pettey | 709/250 |
| 7,149,819 B2* | 12/2006 | Pettey | 709/250 |
| 7,349,999 B2* | 3/2008 | Krithivas | 710/33 |
| 7,356,608 B2* | 4/2008 | Rimmer | 709/238 |
| 7,724,748 B2 | 5/2010 | Davis | |
| 7,983,275 B2* | 7/2011 | Davis | 370/395.53 |
| 2004/0213220 A1 | 10/2004 | Davis | |
| 2006/0203846 A1 | 9/2006 | Davis | |
| 2010/0226375 A1 | 9/2010 | Davis | |

OTHER PUBLICATIONS

"U.S. Appl. No. 11/431,039 Non-Final Office Action mailed Aug. 28, 2008", 15 pgs.

"U.S. Appl. No. 11/431,039, Final Office Action mailed Oct. 27, 2009", 5 pgs.

"U.S. Appl. No. 11/431,039, Notice of Allowance mailed Jan. 14, 2010", 6 pgs.

"U.S. Appl. No. 11/431,039, Response filed Jan. 28, 2009 to Non-Final Office Action mailed Aug. 28, 2008", 11 pgs.

"U.S. Appl. No. 11/431,039, Response filed Jul. 13, 2009 to Non Final Office Action mailed Apr. 13, 2009", 10 pgs.

"U.S. Appl. No. 11/431,039, Response filed Dec. 28, 2009 to Final Office Action mailed Oct. 27, 2009", 10 pgs.

"U.S. Appl. No. 12/784,378, Non-Final Office Action mailed Sep. 29, 2010", 12 pgs.

"U.S. Appl. No. 12/784,378, Notice of Allowance mailed Mar. 10, 2011", 7 pga.

"U.S. Appl. No. 12/784,378, Response filed Dec. 29, 2010 to Non Final Office Action mailed Sep. 29, 2010", 10 pgs.

\* cited by examiner

FIG. 2

| 48 | 24 | 16 | 1 |
|---|---|---|---|
| VENDOR ID | RSVD (00) | BASE IB LID | |

FIG. 3

| | |
|---|---|
| NETWORK LAYER ADDRESS 1 | ETHERNET ADDRESS 1 |
| NETWORK LAYER ADDRESS 2 | ETHERNET ADDRESS 2 |
| NETWORK LAYER ADDRESS 3 | ETHERNET ADDRESS 3 |
| NETWORK LAYER ADDRESS 4 | ETHERNET ADDRESS 4 |
| ↓ | ↓ |
| NETWORK LAYER ADDRESS N | ETHERNET ADDRESS N |

LAN EMULATION OVER INFINIBAND FABRIC APPARATUS, SYSTEMS, AND METHODS

RELATED APPLICATIONS

This application is a continuation of U.S. patent application Ser. No. 12/784,378, filed May 20, 2010 now U.S. Pat. No. 7,983,275, which is a continuation of U.S. patent application Ser. No. 11/431,039, filed May 9, 2006, now issued as U.S. Pat. No. 7,724,748, which is a continuation of U.S. patent application Ser. No. 09/749,383, filed on Dec. 28, 2000 now abandoned, which applications are incorporated herein by reference in their entirety.

TECHNICAL FIELD

This invention relates to local area networks (LANs), and more specifically to emulation of connectionless LANs over connection-oriented fabrics.

BACKGROUND INFORMATION

A number of networks are moving towards a connection-oriented arrangement. An example of a connection-oriented technology is Asynchronous Transfer Mode (ATM). Another example of a proposed technology that includes a connection-oriented (or channel based) capability is known as the Infiniband Architecture (IBA), described in the Infiniband Architecture Specification vol. 1, release 0.9, Mar. 31, 2000, authored by the Infiniband Trade Association. While connection-oriented technologies offer many advantages, in many instances it is desirable to maintain an interoperability between an existing connectionless technology and the connection-oriented technology. It is also desirable to maintain such interoperability, for example, when transitioning from a connectionless technology to a connection-oriented technology (or network) to allow existing software and components (e.g., legacy software) to be used. The Institute for Electrical and Electronics Engineers (IEEE) 802.3 Ethernet local area network (LAN) standard is an example of a common connectionless technology for a network.

Current approaches to provide LAN emulation over a connection-oriented network (such as ATM) have a number of disadvantages. One example is ATM LAN emulation, which is in a specification provided by the ATM forum for the coexistence of legacy LANs and ATM LANs, ATM forum, "LAN emulation over ATM specification" version 1.0, 1995. The ATM LAN emulation specification is discussed in William Stallings, "Data and Computer Communications," pages 487-495, fifth edition, 1997.

As described in Stallings, the ATM LAN emulation specification proposes the use of a centralized LAN emulation service (LES) to perform basic LAN emulation services for nodes in a network, including: to set up connections and to map Media Access Control (MAC) addresses to ATM addresses. The LES also includes a broadcast and unknown server (BUS) service to provide broadcast/multicast of a packet to a plurality of nodes upon request from a client, and to provide a specialized protocol to allow nodes to learn ATM addresses of other nodes (i.e., by sending a LE_ARP_request message).

Currently, there are no existing 802.3 LAN emulation mechanisms in place for Infiniband fabrics. Moreover, there are a number of disadvantages of systems such as the ATM LAN emulation mentioned previously. First, by using a centralized LES service, the network is prone to a single point of failure. Furthermore, the ATM LAN emulation described above, requires a separate and specialized address resolution protocol (ARP) (which is not compatible with the legacy or existing LAN networks) in order to attain the ATM address of a node corresponding to the node's MAC or LAN address. Moreover, calls through the operating system kernel requiring multiple buffer copies of data is typically required in many such existing computer systems, which can burden a processor with substantial overhead.

The specialized name service and address resolution protocol maps Internet Protocol (IP) addresses to the mediums connection semantics. This method requires client software on each node and a centralized LAN emulation (LANE) server node that processes the ARPs, broadcast frames and multicast frames. Current LAN emulation architectures that map connection-oriented networks to 802.3 Ethernet generally map the connections to IP network addresses. This restricts the protocol to Transmission Control Protocol/Internet Protocol (TCP/IP) only. Further, in current systems, broadcasting in software over connection-oriented networks typically requires a buffer copy for each channel to send to all remote connected nodes. In addition, multicast traffic is not typically supported over existing connection-oriented networks.

Therefore, there is a need for an 802.3 LAN emulation mechanism for Infiniband fabrics that solves the above noted problems of current systems.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 2 is a diagram of an example format of an 802.3 MAC address with embedded Infiniband LID according to an example embodiment of the present invention;

FIG. 3 is a table of an example mapping in an address resolution protocol according to an example embodiment of the present invention;

DETAILED DESCRIPTION

Figure 1:
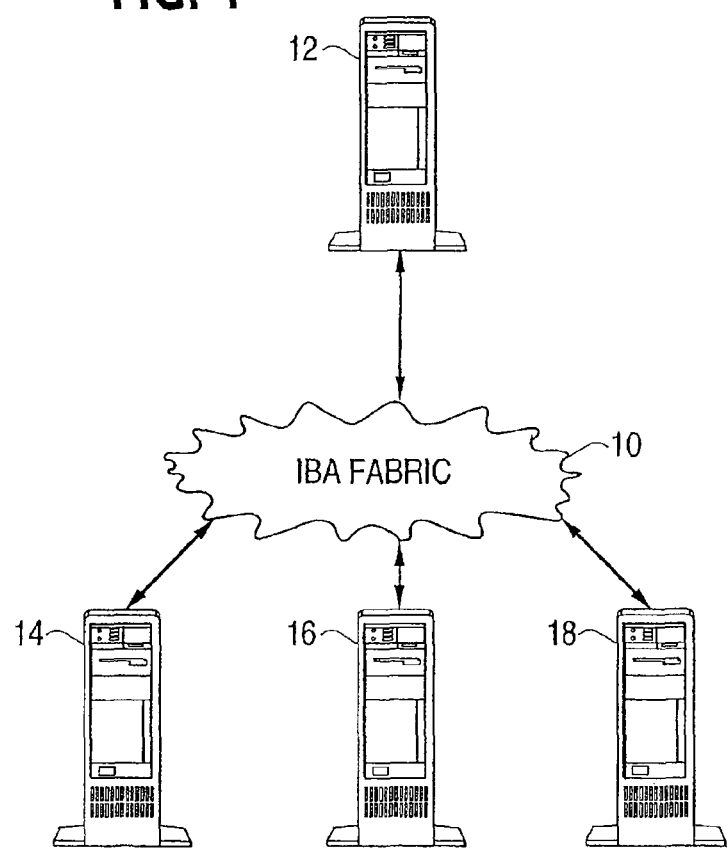
FIG. 1 is a diagram of an example system for LAN emulation according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to methods and devices for LAN emulation over Infiniband (IB) fabrics. According to the present invention, Infiniband connection-oriented fabrics may be presented to a protocol stack's networking layer as in 802.3 Ethernet network. Therefore, a connectionless LAN (802.3 Ethernet) is emulated over a connection-oriented fabric (Infiniband fabric). The present invention uses a name service to identify all Infiniband LAN emulation (IBLAN) nodes on the fabric. The present invention includes a software service that allows broadcast and multicast frames to be distributed to all nodes. According to the present invention, an Infiniband LID address is embedded in a standard Ethernet MAC header. This allows legacy network support on a local IBA subnet by tunneling standard 802.3 Ethernet frames across the subnet using Infiniband Architecture transport services.

Infiniband Architectures provide many transport mechanisms (e.g., reliable and unreliable connections, reliable and unreliable datagrams, raw datagrams, and multicast services), for transferring data. In devices and methods according to the present invention, interoperability with all Infiniband Architectures is assured by providing mechanisms that consider the least common denominator of all Infiniband Architecture features. This includes, at a minimum 256 byte packet size, unreliable datagram, unreliable connection, and reliable connection. However, packet sizes of 512, 1024, 2048, and 4096, as well as multicasting and reliable and raw datagram service may also be incorporated according to the present invention. LAN emulation according to the present invention includes broadcasting and multicasting, Ethernet to Infiniband Architecture address mapping, and Infiniband host node discovery.

Address mapping may be achieved by using the 16 bit base local identifier (LID) assigned to each port on each node of an Infiniband fabric. The host node may use this base LID address as the basis for its 48 bit Ethernet MAC address and treat each port as a separate network interface card (NIC). This address may be used by protocol drivers to update their local address resolution protocol (ARP) table and may be used as the reply to standard ARP requests. Node discovery may be accomplished by using the Subnet Management Administration Interface to query for a complete list of nodes on the fabric. The result of the query, a host node list, may be used an IBLAN node to simulate Ethernet and direct all broadcast and multicast frames. Unicast frames may be directed to specific IBLAN nodes using the embedded LID.

FIG. 1 shows a diagram of an example system for LAN emulation according to an example embodiment of the present invention. Infiniband Architecture fabric 10 has a number of hosts or nodes attached to it. These include nodes 12-18. Nodes 12-18 may all include an IBLAN driver, therefore, allowing the transfer of Ethernet messages among nodes 12-18. Although only four nodes are shown in this system diagram, there may be many more nodes that exist on the fabric and still be within the spirit and scope of the present invention. Further, one or more of nodes 12-18 connected to the Infiniband Architecture fabric 10 may be a subnet manager node. The subnet manager manages the subnet and performs initialization processes whereby the subnet manager identifies all nodes on fabric 10. The subnet manager assigns a local identifier (LID) to each port of a host or node and activates the port. A node may have one or more ports, each with a unique LID. The subnet manager stores this fabric topology information whereby it may be accessed by other nodes on the fabric.

Moreover, one or more of nodes 12-18 that reside on IBA fabric 10 may be a bridge to another subnet or a different network all together. For example, node 16 may not only connect to Infiniband fabric 10, but may also have a port that is connected to a standard Ethernet network. In this situation, node 16 serves as a bridge between Infiniband fabric 10 and an Ethernet network.

FIG. 2 shows a diagram of an example format of an 802.3 MAC address with embedded Infiniband LID according to an example embodiment of the present invention. The 48 bit address includes a base Infiniband LID address of 16 bits, a reserved portion that includes 8 bits, and a vendor ID portion of 24 bits. The base Infiniband LID address is an address associated with a port of a node connected to an Infiniband fabric. The 8 bit reserve section may be used as needed by a particular application or function. The vendor ID is for plug and play and indicates a manufacturer, specific model, and/or version of a device. The vendor ID helps plug and play configure the node with appropriate drivers to run a particular device of the manufacturer.

FIG. 3 shows a table of an example mapping in an address resolution protocol according to an example embodiment of the present invention. An address resolution protocol (ARP) that resides at each node on the Infiniband fabric 10 that includes an IBLAN driver, maps network layer addresses, e.g., IP addresses, to Ethernet 48 bit MAC physical addresses. This mapping may be stored as an address resolution protocol table and is updated based on changes to nodes on the Infiniband fabric. The Ethernet address on the right side of the table shown in FIG. 3 corresponds to the format of the address shown in FIG. 2.

To illustrate, node 12 on Infiniband fabric 10 may desire to send data to node 14 on Infiniband fabric 10. An application or device at node 12 may generate a network layer address based on a network protocol used at node 12. The address resolution protocol maps the network layer address to a physical Ethernet address. Initially, a broadcast Ethernet address is sent across the Infiniband fabric to all nodes, e.g., 14, 16, 18, etc., that reside on Infiniband fabric 10 and include an IBLAN driver. The Ethernet broadcast address may contain all ones in the 48 bit destination address, whereas the 48 bit source address contains the LID of each node on the Infiniband fabric. All nodes receive the broadcast message and whichever node has the network layer address may respond by sending a unicast message containing the LID of the destination node back to node 12. Node 12 uses this LID and directs a unicast message to the destination node using a known channel. All nodes on the Infiniband fabric, i.e., all NICs, are capable of receiving a destination address of all ones (e.g., broadcast message), a destination address with the most significant bit set to "1" but the rest not all ones (e.g., multicast message), or their unique Infiniband LID address (e.g., unicast message). The network protocol header, e.g., IP header, that resides after the Ethernet header may be used by upper level software at a destination node to determine if this broadcast message is for this particular node. If the message is not for this particular node, the multicast or broadcast message may simply be discarded.

Figure 4:
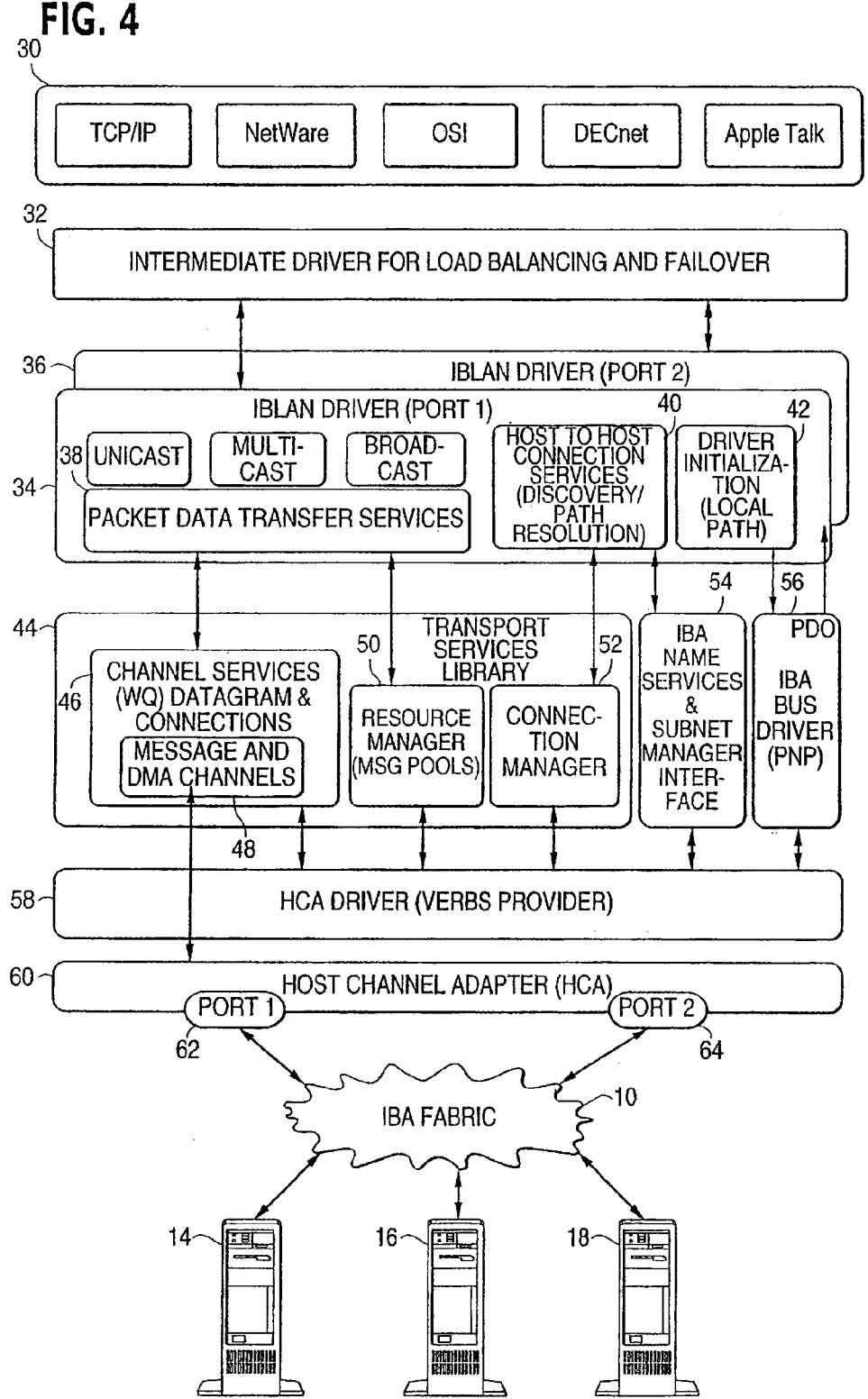
FIG. 4 is a diagram of an example software stack that resides in an IBLAN emulating node according to an example embodiment of the present invention.

FIG. 4 shows a diagram of an example software stack that resides in an IBLAN emulating node according to an example embodiment of the present invention. The stack consists of a network protocol layer 30, one or more Infiniband LAN (IBLAN) driver(s) 34, 36, a transport services library layer 44, along with an IBA name services and subnet manager interface 54 and IBA bus driver 56, a host channel adaptor (HCA) driver 58, and a host channel adapter 60. The stack may also include an intermediate driver 32 for load balancing and failover. Intermediate driver 32 driver may reside between network protocol layer 30 and the IBLAN driver(s) 34, 36.

Network protocol stack 30 may include any protocol, for example, TCP/IP, NetWare, Open Systems Interconnections (OSI), DECnet, AppleTalk, etc. Intermediate drivers 32 may be layered between the protocol stacks and multiple IBLAN drivers. Intermediate drivers 32 may consolidate multiple instances of IBLAN drivers into one and may manage the load balances and failover across two or more ports (e.g., two in FIG. 4). Each IBLAN driver 34, 36 may include packet data transfer services 38 for unicast, multicast and broadcast transfers across an Infiniband fabric 10, host to host connection services 40 that discovers and resolves connection paths between hosts (by communicating with subnet manager on fabric), and driver initialization function 42 used to initialize an IBLAN driver. Each IBLAN driver implementation 34, 36 establishes policy for managing connections between nodes based on the destination MAC address. If Infiniband channels are relatively cheap based on hardware and memory requirements, then drivers may wish to establish node to node connections during address resolution protocol processing and keep the channels active indefinitely instead of aging (giving the channels back after use) them. If connection aging is performed at the driver level, it may be desirable to sink up the IBLAN driver with the address resolution protocol aging table process to insure that subsequent address resolution protocol processing is provided to initiate new connections.

The Infiniband Architecture currently defines multicasting within the fabric as an optional feature. Since multicasting is optional, an IBLAN driver according to the present invention provides multicasting and broadcasting in software to ensure interoperability with all and any hardware, including hardware without multicasting (e.g., first generation hardware).

Transport services library 44 provides Infiniband transport services which include connection management, work queue management, memory management, and message pool management. The IBLAN driver 34, 36 uses the service layer to establish connections and send data to any peer IBLAN driver on the fabric. Transport services library 44 includes: channel services datagram and connections section 46 which includes message and DMA channels 48; a resource manager that manages the message pools; and a connection manager 52. Channel services 46 performs segmentation and reassembly of datagrams so that the maximum transfer unit (MTU) for IBLAN drivers may exceed the 256 byte limit of minimum size Infiniband Architecture packets. Further, an IBLAN driver is allowed to report one MTU to the protocol drivers that may be used for both messages on unreliable connections (unicast) and messages on unreliable datagrams (multicast, broadcast, etc.). Connection manager 52 discovers the remote node's datagram work queue pair. The name service 54, TSL connection manager 52, and the TSL channel services 46 may be used to support multicasting and broadcasting by the IBLAN driver.

Infiniband Architecture name services and subnet manager interface 54 may be used by IBLAN driver 34, 36 to get a list of active nodes on the fabric and locate the appropriate port and LID for each remote IBLAN interface. This interface also supports periodic queries or event notification which indicates nodes coming and going. The Infiniband Architecture defines subnet administration that manages a subnet. Subnet administration via a subnet management database (SMDB) provides persistent storage of subnet topology, and events and configuration information. Infiniband Architecture name services and subnet management interface 54 provides class drivers with an application programming interface (API) and interface to query the SMDB and schedule events. This interface may be used to locate all active remote IBLAN nodes on the fabric. Path information to remote IBLAN nodes on the fabric may be provided via this mechanism so that an IBLAN driver may maintain primary and secondary paths for redundancy. An IBLAN driver according to the present invention may periodically query the SMDB for link and node activity. The following are example API calls from an IBLAN driver to a subnet manager to query and get LID"s back: "IbaNsGetPlatformGuidListByDeviceType( )", "IbaNsGetPortGuidListByPlatformGuid( )", and "IbaNsGetLidListByPortGuid( )".

Infiniband Architecture bus driver 56 loads and IBLAN driver when a local port is initialized with a LID and is set to the active state. Infiniband Architecture bus driver 56 also may provide an interface to the IBLAN driver which returns the LID and the LID mask of this new activated port. In this example embodiment, bus driver 56 loads two instances of the IBLAN driver and gives the first one the LID assigned to port one and the second the LID assigned to port two.

The Infiniband Architecture defines a configuration manager (CFM) that acts as the agency to manage ownership and sharing of I/O controllers (IOC) by hosts. The CFM provides data maintained in the configuration management database (CMDB). Access to the CMDB may be provided by configuration management class MADS. Each host loads an Infiniband Architecture bus driver that discovers IOCs, generates plug and play objects, and provides drivers with the appropriate Infiniband Architecture information for connectivity. In addition to the remote IOCs, the bus driver may also discover all local host channel adapters (HCAs) and ports for IBLAN driver initialization. A vendor ID and device ID may be used to locate and load the appropriate IBLAN driver at a node. An instance of an IBLAN driver may be expected to be loaded for each active port. Each port is treated like a network interface card (NIC) so that load balancing (multiplexing data between two or more channels which increases performance) and failover (switching between paths or ports) may be done with intermediate network device interface (NDIS) drivers, similar to existing PCI NICs. Intermediate driver 32 may only bundle NICs that are on the same Infiniband Architecture subnet.

Hardware channel adaptor driver 58 drives host channel adaptor 60. In this example embodiment, host channel adaptor 60 contains two ports 62 and 64. As noted previously, an IBLAN driver 34, 36 may be associated with each port 62, 64 respectively.

Host channel adaptor driver 58 controls the low level hardware interface. Host channel adaptor driver 58 provides a verbs (defined in the Infiniband Architecture specification) API for upper level layers needing Infiniband transport services.

Figure 5:
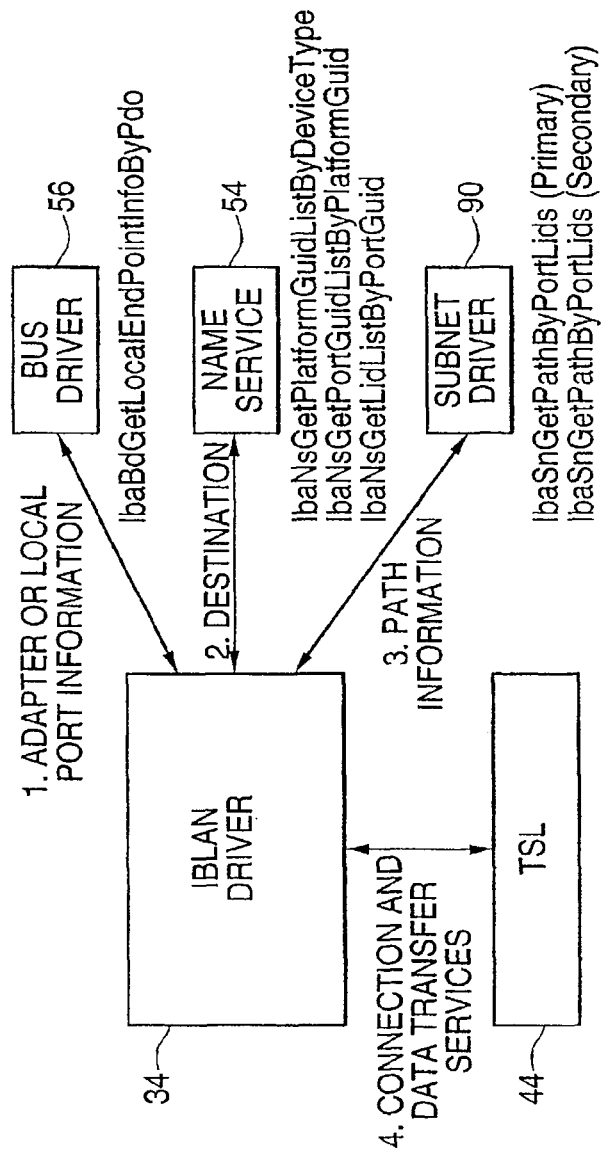
FIG. 5 is a block diagram of an example initialization sequence of an IBLAN driver according to an example embodiment of the present invention.

FIG. 5 shows a block diagram of an example initialization sequence of an IBLAN driver according to an example embodiment of the present invention. Bus driver 56 provides IBLAN driver 34 with adaptor or local port information (example API call—"IbaBdGetLocalEndPointInfoByPdo"). Name service 54 provides destination and path information to IBLAN driver 34 (example API calls noted previously). Subnet driver 90 provides path information to IBLAN driver 34 (example API call—"IbaSnGetPathByPortLids", once each for getting primary and secondary paths). TSL 44 provides connection and data transfer services to IBLAN driver 34.

Figure 6:
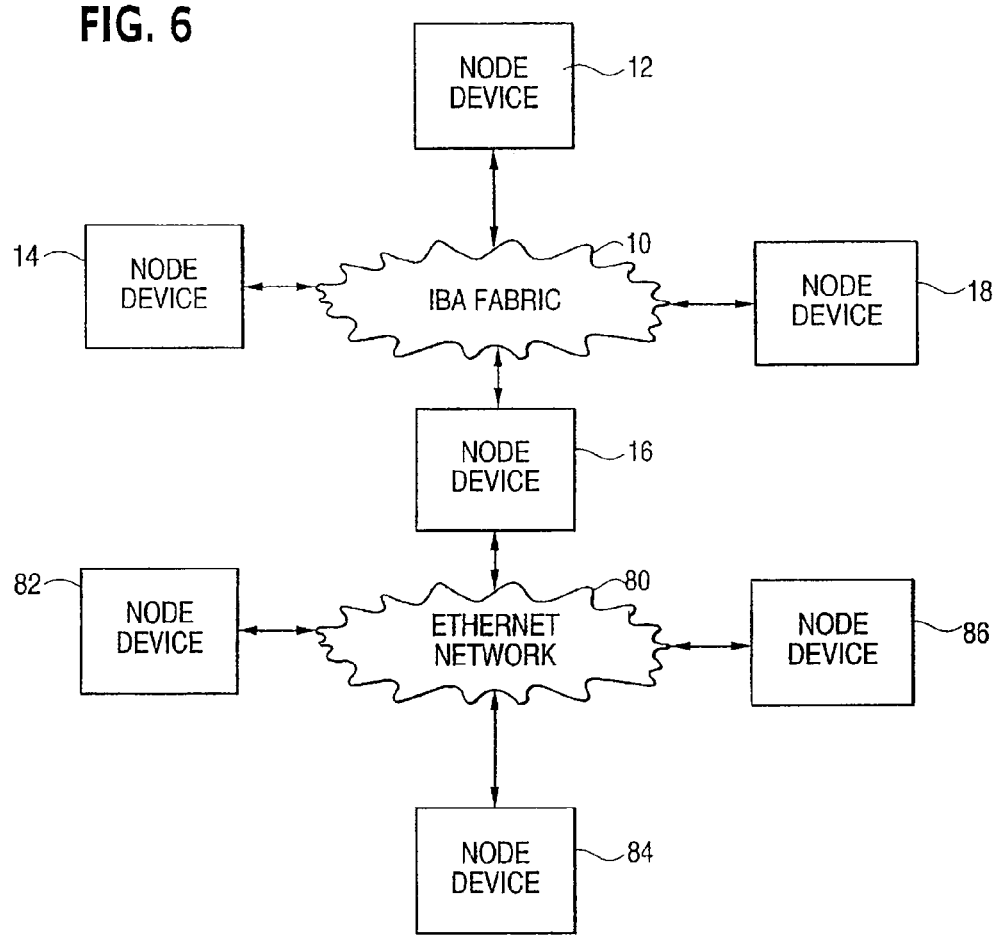
FIG. 6 is a system diagram of an example bridge node between an Infiniband fabric and Ethernet network according to an example embodiment of the present invention.

FIG. 6 shows a system diagram of an example bridge node between an Infiniband fabric and Ethernet network according to an example embodiment of the present invention. As shown in FIG. 6, an Infiniband fabric 10 includes node devices 12, 14, 16 and 18. However, node device 16 also has another port that connects to an Ethernet network 80. Ethernet network 80 also contains additional node devices 82, 84 and 86. Node devices 12-16 contain IBLAN drivers according to the present invention, therefore, a network protocol in node 12 may send an Ethernet data transfer across IB fabric 10 to node device 16 which then may transfer the Ethernet data transfer onto Ethernet network 80 to one or more of node devices 82-86. This is advantageous in that a network protocol residing at node device 12 need not know that the Ethernet traffic that is being sent to a node on an Ethernet network, e.g., 80, has transferred across an Infiniband fabric to get there.

The present invention is advantageous in that it is the first implementation of an 802.3 LAN emulation for an Infiniband Architecture. Further, according to the present invention no specialized name servers and address resolution protocol are required. Moreover, the present invention is not restricted to a TCP/IP protocol only, but imbeds an Infiniband link level local identifier (LID) address in an 802.3 Ethernet MAC address so that any protocol may run on top of Infiniband (IB) fabrics. Also, regarding broadcasting, the present invention avoids the buffer copy by posting the same buffer to each separate Infiniband channel. The present invention also provides a mechanism to support multicast traffic over Infiniband fabrics. In addition, the present invention provides a mechanism to fail-over to secondary paths via the same port. Moreover, a load balance and fail-over driver may be stacked on top of IB LAN drivers to provide redundancy across multiple ports and/or channel-adaptors. The present invention may use a combination of channel and datagram services to provide scalability even with channel adaptors that have limited channel work queue resources.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein; rather, the present invention extends to all functionally equivalent structures, methods and uses, such as are within the scope of the appended claims.

What is claimed is:

1. A method, including:
at a local Infiniband (IB) node on an IB subnet, interfacing an IB protocol driver to a network protocol driver associated with a network protocol stack using a local Infiniband local area network (IBLAN) driver by emulating an Ethernet network interface card (NIC) driver at an interface between the local IBLAN driver and the network protocol driver;
receiving an outbound Ethernet frame from the network protocol driver;
embedding the outbound Ethernet frame in at least one outbound IB request packet to tunnel the outbound Ethernet frame across the IB subnet; and
causing the at least one outbound IB request packet to be sent to at least one remote IB node on the IB subnet, wherein the at least one remote IB node is configured with a remote IBLAN driver.

2. The method of claim 1, wherein the network protocol driver comprises a transport control protocol/Internet protocol (TCP/IP) driver.

3. The method of claim 1, further including:
generating a local Ethernet media access control (MAC) address at the local IBLAN driver to be used by the local IBLAN driver to emulate the NIC driver, wherein the local Ethernet MAC address includes a local IB local identifier (LID) associated with the IB protocol driver.

4. The method of claim 3, wherein the local IB LID is received at the local IBLAN driver from a name service component of the IB protocol driver.

5. The method of claim 3, wherein a low-order bit field associated with the local Ethernet MAC address comprises the local IB LID.

6. The method of claim 3, wherein the at least one outbound IB request packet is sent from a local IB port on the local IB node, and wherein the local IB LID is assigned to the local IB port by a subnet manager.

7. The method of claim 1, wherein a network protocol datagram is embedded in the outbound Ethernet frame, wherein a destination Ethernet address in the outbound Ethernet frame corresponds to a remote Ethernet address extracted from a local address resolution protocol (ARP) table by the network protocol driver, and wherein the remote Ethernet address and a destination network address embedded in the network protocol datagram are associated in the local ARP table.

8. The method of claim 7, further including:
upon receiving the outbound Ethernet frame at the local IBLAN driver, extracting a destination IB local identifier (LID) embedded in the destination Ethernet address in the outbound Ethernet frame; and
populating a destination IB LID field in a local route header associated with the at least one outbound IB request packet with the destination IB LID, wherein the destination IB LID corresponds to the at least one remote IB node.

9. The method of claim 1, further including:
querying a subnet manager associated with the IB subnet from the local IBLAN driver to obtain a list of IB local identifiers (LIDs), each of the IB LIDs associated with an active port on the at least one remote IB node.

10. The method of claim 9, wherein the outbound Ethernet frame comprises at least one of a broadcast frame or a multicast frame to be broadcast to the at least one remote IB node by tunneling the outbound Ethernet frame to each IB LID on the list of IB LIDs.

11. An article including a machine-accessible, non-transitory medium having stored therein associated information, wherein the information, when accessed, results in a machine performing:
   at a local Infiniband (IB) node on an IB subnet, interfacing an IB protocol driver to a network protocol driver associated with a network protocol stack using a local Infiniband local area network (IBLAN) driver by emulating an Ethernet network interface card (NIC) driver at an interface between the local IBLAN driver and the network protocol driver;
   receiving an outbound Ethernet frame from the network protocol driver;
   embedding the outbound Ethernet frame in at least one outbound IB request packet to tunnel the outbound Ethernet frame across the IB subnet; and
   causing the at least one outbound IB request packet to be sent to at least one remote IB node on the IB subnet, wherein the at least one remote IB node is configured with a remote IBLAN driver.

12. The article of claim 11, wherein the information, when accessed, results in a machine performing:
   generating a local Ethernet media access control (MAC) address at the local IBLAN driver to be used by the local IBLAN driver to emulate the NIC driver, wherein the local Ethernet MAC address includes a local IB local identifier (LID) associated with the IB protocol driver.

13. The article of claim 11, wherein a network protocol datagram is embedded in the outbound Ethernet frame, wherein a destination Ethernet address in the outbound Ethernet frame corresponds to a remote Ethernet address extracted from a local address resolution protocol (ARP) table by the network protocol driver, and wherein the remote Ethernet address and a destination network address embedded in the network protocol datagram are associated in the local ARP table.

14. The article of claim 13, wherein the information, when accessed, results in a machine performing:
   upon receiving the outbound Ethernet frame at the local IBLAN driver, extracting a destination IB local identifier (LID) embedded in the destination Ethernet address in the outbound Ethernet frame; and
   populating a destination IB LID field in a local route header associated with the at least one outbound IB request packet with the destination IB LID, wherein the destination IB LID corresponds to the at least one remote IB node.

15. The article of claim 11, wherein the information, when accessed, results in a machine performing:
   querying a subnet manager associated with the IB subnet from the local IBLAN driver to obtain a list of IB local identifiers (LIDs), each IB LID associated with an active port on the at least one remote IB node.

16. The article of claim 15, wherein the outbound Ethernet frame comprises at least one of a broadcast frame or a multicast frame to be broadcast to the at least one remote IB node, wherein the broadcast is effected by tunneling the outbound Ethernet frame to each IB LID on the list of IB LIDs.

17. A system, including:
   at least one local IBLAN driver module coupled between an IB protocol driver module and a network protocol driver module associated with a network protocol stack at a local IB node on an IB subnet, the IBLAN driver module to emulate an Ethernet network interface card (NIC) driver at an interface between the at least one local IBLAN driver module and the network protocol driver module;
   a connection services component within the IBLAN driver module to receive an outbound Ethernet frame from the network protocol driver module, to embed the outbound Ethernet frame in at least one outbound IB request packet in order to tunnel the outbound Ethernet frame across the IB subnet, and to forward the at least one outbound IB request packet to the IB protocol driver module for transmission to at least one remote IB node on the IB subnet, wherein the at least one remote IB node is configured with a remote IBLAN driver; and
   a fiber optic cable to connect the local IB node to the IB subnet.

18. The system of claim 17, wherein a subnet manager associated with the IB subnet is queried from the local IBLAN driver to obtain a list of local IB identifiers (LIDs), each IB LID associated with an active port on the at least one remote IB node.

19. The system of claim 18, wherein the outbound Ethernet frame comprises at least one of a broadcast frame or a multicast frame to be broadcast to the at least one remote IB node, and wherein the broadcast is effected by tunneling the outbound Ethernet frame to each IB LID on the list of IB LIDs.

20. The system of claim 19, wherein the at least one of the broadcast frame or the multicast frame comprises an address resolution protocol (ARP) request.

* * * * *